US008015565B2

(12) United States Patent
Doing et al.

(10) Patent No.: US 8,015,565 B2
(45) Date of Patent: Sep. 6, 2011

(54) PREVENTING LIVELOCKS IN PROCESSOR SELECTION OF LOAD REQUESTS

(75) Inventors: Richard William Doing, Raleigh, NC (US); John R. Patty, Cary, NC (US); Steven Robert Testa, Durham, NC (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 11/284,257

(22) Filed: Nov. 21, 2005

(65) Prior Publication Data

US 2007/0118837 A1 May 24, 2007

(51) Int. Cl.
*G06F 9/46* (2006.01)
(52) U.S. Cl. .................... 718/102; 718/104; 718/100
(58) Field of Classification Search .................. 710/107, 710/244; 718/102, 104
See application file for complete search history.

(56) References Cited

U.S. PATENT DOCUMENTS

| 5,761,446 | A | * | 6/1998 | Donley et al. ................ 710/107 |
| 5,935,234 | A | * | 8/1999 | Arimilli et al. ................ 710/244 |
| 6,601,085 | B1 | * | 7/2003 | Wertheimer et al. ......... 709/200 |
| 7,000,047 | B2 | * | 2/2006 | Nguyen et al. ................ 710/200 |
| 7,065,596 | B2 | * | 6/2006 | Kulick et al. ................. 710/240 |
| 7,401,208 | B2 | * | 7/2008 | Kalla et al. ................... 712/224 |
| 7,500,035 | B2 | * | 3/2009 | Johns et al. ................... 710/113 |
| 7,558,923 | B1 | * | 7/2009 | Bennett et al. ................ 711/144 |
| 2003/0158885 | A1 | * | 8/2003 | Sager ............................ 709/108 |

* cited by examiner

*Primary Examiner* — Meng A An
*Assistant Examiner* — Tammy Lee
(74) *Attorney, Agent, or Firm* — Joan Pennington

(57) ABSTRACT

A method, and apparatus are provided for preventing livelocks in processor selection of load requests in a multiprocessor (MP) system. On random occasions a selection mechanism is changed for first holding up all requests and then a random selection is made. Then a round robin selection mechanism is used for further requests. A livelock-preventing selection mechanism includes a pair of linear feedback shift registers (LFSRs), each LFSR for generating pseudo random values.

14 Claims, 3 Drawing Sheets

PREVENTING LIVELOCKS IN PROCESSOR SELECTION OF LOAD REQUESTS

FIELD OF THE INVENTION

The present invention relates generally to the data processing field, and more particularly, relates to a method, and apparatus for preventing livelocks in processor selection of load requests in a multiprocessor (MP) system.

DESCRIPTION OF THE RELATED ART

Improved computer system performance advantageously is achieved with a multiprocessor (MP) computer system. Multiprocessing computer systems include multiple processors, each processor employed to perform computing tasks. A particular computing task may be performed upon one processor while other processors perform other unrelated computing tasks. Alternatively, components of a particular computing task are distributed among the multiple processors to decrease the time required to perform the computing task as a whole.

One commercially available multiprocessing computer system is a symmetric multiprocessor (SMP) system. An SMP computer system typically includes multiple processors connected through a cache hierarchy to a shared bus. A memory connected to the shared bus is shared among the processors in the system. All processors within an SMP computer system have symmetric access to all resources within the system.

When selecting requests from multiple processors a livelock condition can occur whereby one processor cannot make forward process because one or more of the other processors are consuming all of the available resources or bandwidth. Selection mechanisms such as round-robin or least-recently-used schemes can eliminate part of the problem but further livelocks can exist where the arrival time of requests play a role.

For an example, consider a round robin selection where Round robin points to a first processor P0, and processor P0 wins. Round robin advances to a next processor P1, and processor P1 wins. Round robin advances to next processor P2, and processor P2 wins but is retried because resources are busy with processors P0 and P1. Round robin then advances to first processor P0, and processor P0 wins, and continues forever with processors P0 and P1 winning. In this case processor P2 never gets through and hangs.

A need exists for an effective mechanism to enable processing of load requests in a multiprocessor (MP) computer system while preventing livelocks.

SUMMARY OF THE INVENTION

A principal aspect of the present invention is to provide a method, and apparatus for preventing livelocks in processor selection of load requests in a multiprocessor (MP) system. Other important aspects of the present invention are to provide such method, and apparatus for preventing livelocks in processor selection of load requests in a multiprocessor (MP) system substantially without negative effect and that overcome many of the disadvantages of prior art arrangements.

In brief, a method, and apparatus are provided for preventing livelocks in processor selection of load requests in a multiprocessor (MP) system. On random occasions a selection mechanism is changed for first holding up all requests and then a random selection is made. Then a round robin selection mechanism is used for further requests.

In accordance with features of the invention, a livelock-preventing selection mechanism is configurable to change the duration of the random selection so that performance degradation due to holding up requests is minimized. The livelock-preventing selection mechanism includes a pair of linear feedback shift registers (LFSRs), each LFSR generates pseudo random values.

In accordance with features of the invention, the random occasions the selection mechanism is changed is determined based upon a first one of the LFSRs and the random selection is determined based upon a second one of the LFSRs. The duration of the random selection is determined based upon the second one of the LFSRs.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method for preventing livelocks in processor selection of load requests uses a pair of linear feedback shift registers (LFSRs). Each LFSR generates pseudo random values used along with a round robin selection mechanism that normally selects requests in a round robin fashion. On random occasions determined by one of the LFSRs the selection mechanism is changed by first holding up all requests in order to allow each processor time to re-establish retried requests and then a random selection is made. Then the normally active round robin selection mechanism takes over for further requests. This livelock-preventing mechanism is configurable to change the duration of the random selection so that performance degradation due to holding up requests is minimized.

Figure 1:
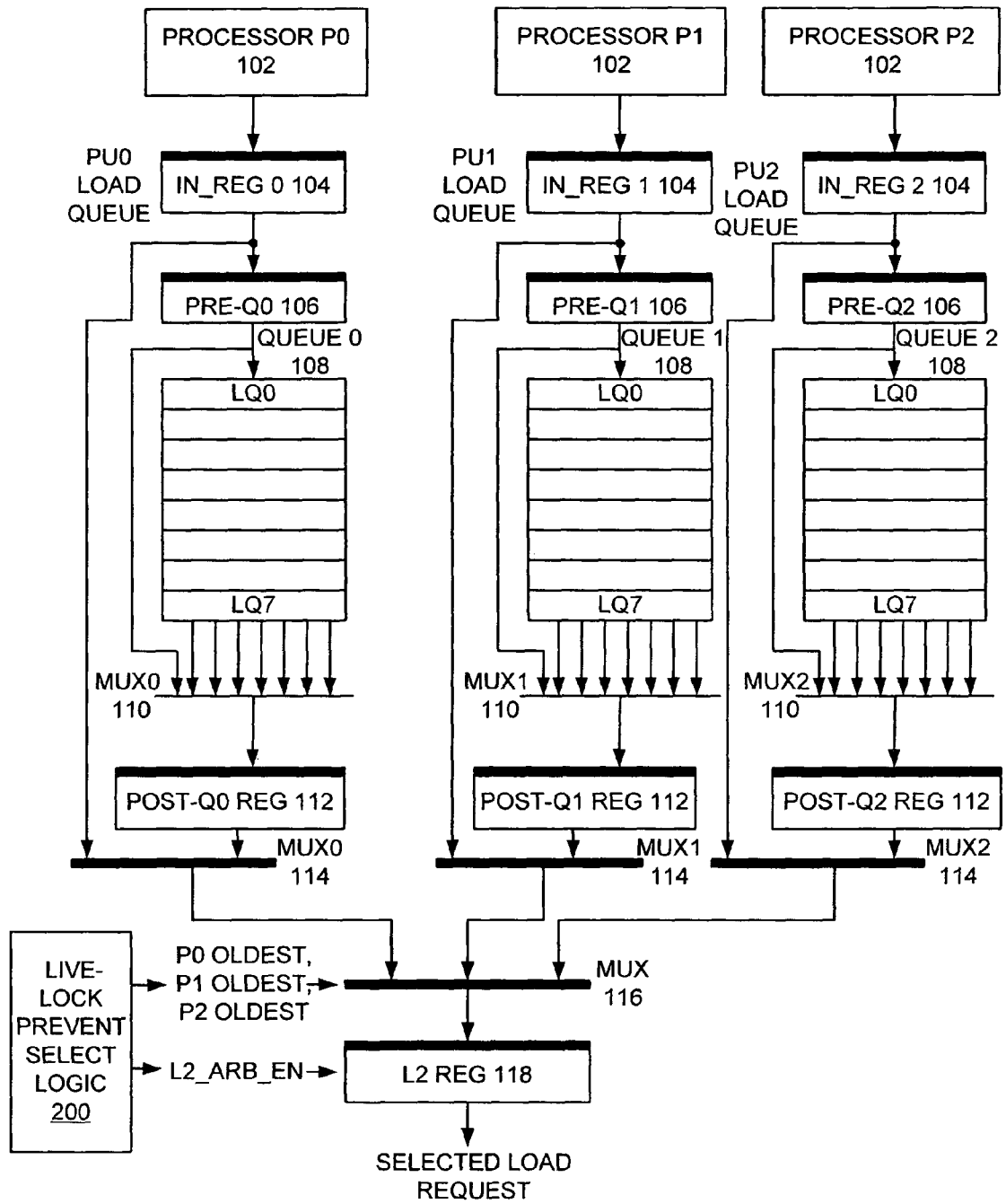
FIG. 1 is a schematic and block diagram representation of a multiprocessor (MP) system for implementing methods for preventing livelocks in processor selection of load requests in accordance with the preferred embodiment.

Having reference now to the drawings, in FIG. 1, there is shown a multiprocessor system generally designated by the reference character 100 for implementing methods for preventing livelocks in processor selection of load requests in accordance with the preferred embodiment. Multiprocessor system 100 includes a number of processors or processing units (PU) 102, P0, P1, P2. Each processor 102, P0, P1, P2 includes a respective load queue indicated by PU0 LOAD QUEUE, PU1 LOAD QUEUE, PU2 LOAD QUEUE and a livelock prevent selection logic 200. Each processor 102, P0, P1, P2 includes a respective instruction register 104 IN_REQ0, IN_REQ1, and IN_REQ2 coupled to a respective pre-queue register 106, PRE-Q0, PRE-Q1, and PRE-Q2, and a respective queue 108, QUEUE 0, QUEUE 1, and QUEUE 2. Each respective queue 108, QUEUE 0, QUEUE 1, and QUEUE 2 includes a number of stages for storing load requests indicated by LQ0-LQ7.

Multiprocessor system 100 includes a respective multiplexer 110, MUX0, MUX1, MUX2. Each respective multiplexer 110, MUX0, MUX1, MUX2 is coupled to the output of the respective associated pre-queue register 106, PRE-Q0, PRE-Q1, PRE-Q2 and is coupled to the respective associated queue 108, QUEUE 0, QUEUE 1, QUEUE 2. Each respective multiplexer 110, MUX0, MUX1, MUX2 is, for example, a 9:1 multiplexer with the illustrated 8-stage queue 108.

Multiprocessor system 100 includes a respective post-queue register 112, POST-Q0, POST-Q1, POST-Q2 coupled to the output of the respective associated multiplexer 110, MUX0, MUX1, MUX2. A respective multiplexer 114, MUX0, MUX1, MUX2 is coupled to the respective associated post-queue register 112 and respective associated instruction register 104 IN_REQ0, IN_REQ1, and IN_REQ2 that provides a processor load queue bypass.

Each multiplexer 114, MUX0, MUX1, MUX2 is a 2:1 multiplexer. The output of multiplexers 114, MUX0, MUX1, MUX2 are applied to a selection multiplexer 116, MUX0, MUX1, MUX2 that receives the processor control selection signals P0 OLDEST, P1 OLDEST AND P2 OLDEST. Livelock-preventing select logic apparatus 200 illustrated and described with respect to FIG. 2 generates the processor control selection signals P0 OLDEST, P1 OLDEST AND P2 OLDEST for preventing livelocks in processor selection of load requests in accordance with the preferred embodiment. A register 118, L2 REG holds the next selected load request for a L2 cache (not shown) from one of the illustrated processors 102, P0, P1, P2.

In accordance with features of the invention, requests are allowed to be selected continuously as long as L2_ARB_EN is active. Otherwise, when an inactive L2_ARB_EN is applied to the register 118, requests are held back where they can collect in the load queues 108 and the selection logic has no effect until L2_ARB_EN returns active. Processor selection is handled by the 1-hot selection signals P0 OLDEST, P1 OLDEST AND P2 OLDEST applied to multiplexer 116. These are normally updated in a round robin manner but are randomly chosen when the livelock logic controls selection P0 OLDEST, P1 OLDEST AND P2 OLDEST, as illustrated and described with respect to FIGS. 2 and 3.

Figure 2:
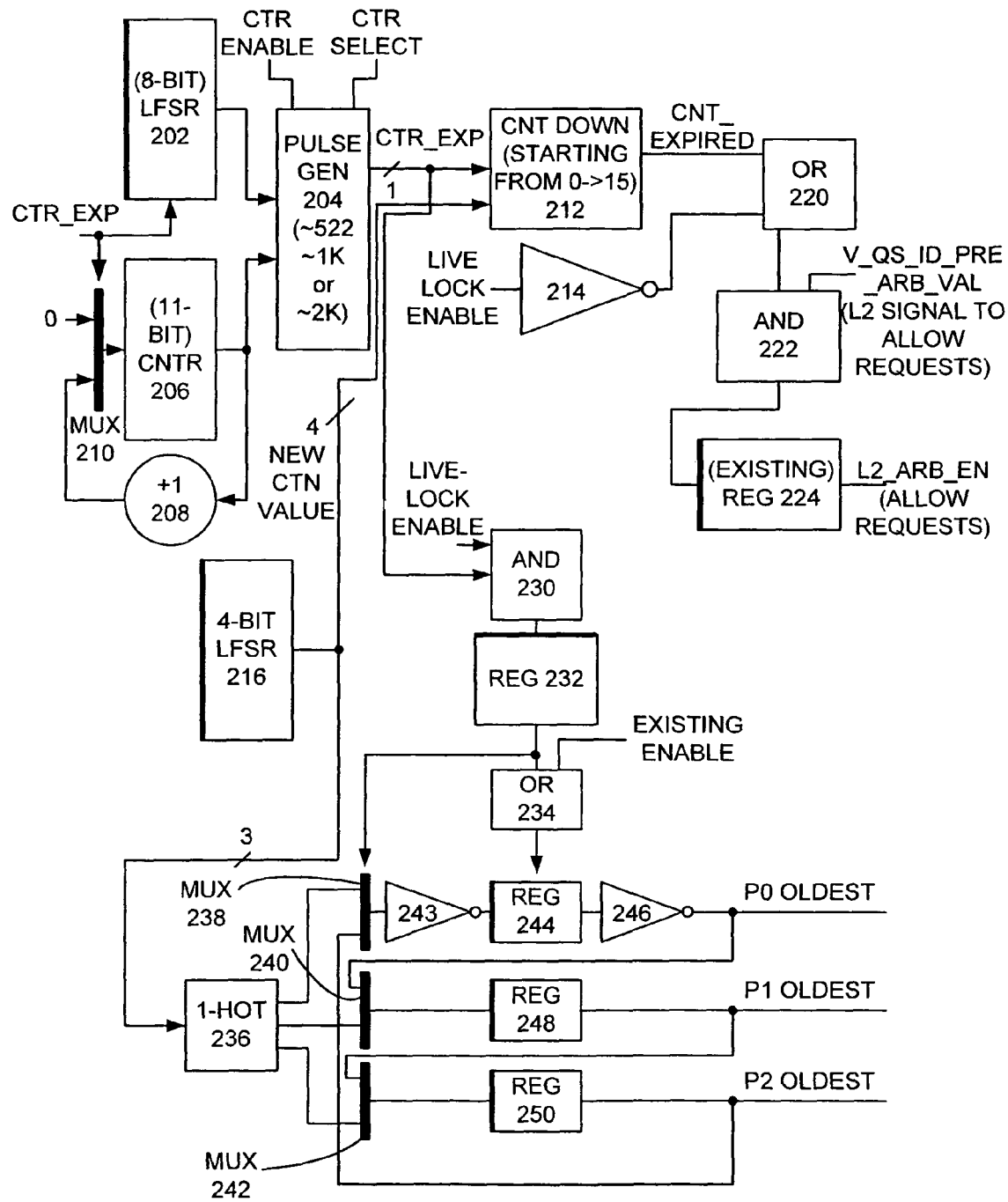
FIG. 2 is a schematic and block diagram representation illustrating livelock-preventing selection logic apparatus for preventing livelocks in processor selection of load requests in accordance with the preferred embodiment.

Referring now to FIG. 2, there is shown exemplary livelock-preventing select logic apparatus generally designated by the reference character 200 for implementing methods for preventing livelocks in processor selection of load requests in accordance with the preferred embodiment.

In accordance with features of the invention, livelock-preventing select logic apparatus 200 is driven by LFSRs and randomly invoked to hold up requests from all processors generating control signal L2_ARB_EN and then make a random processor selection via signals P0 OLDEST, P1 OLDEST and P2 OLDEST.

Selection logic apparatus 200 includes a first LFSR 202 coupled to a pulse generator 204. A counter 206, such as a 11-bit counter, has an output feedback +1 208 applied to a first input of a multiplexer MUX 210 with a 0 applied to another input of MUX 210. Counter 206 provides a second input to the pulse generator 204. The pulse generator 204 that generates a pulse at a programmable interval, such as 512, 1K or 2K cycles together with a plus or a minus random offset determined based upon a value applied by the first LFSR 202 at an output node labeled CTR_EXP.

Figure 3:
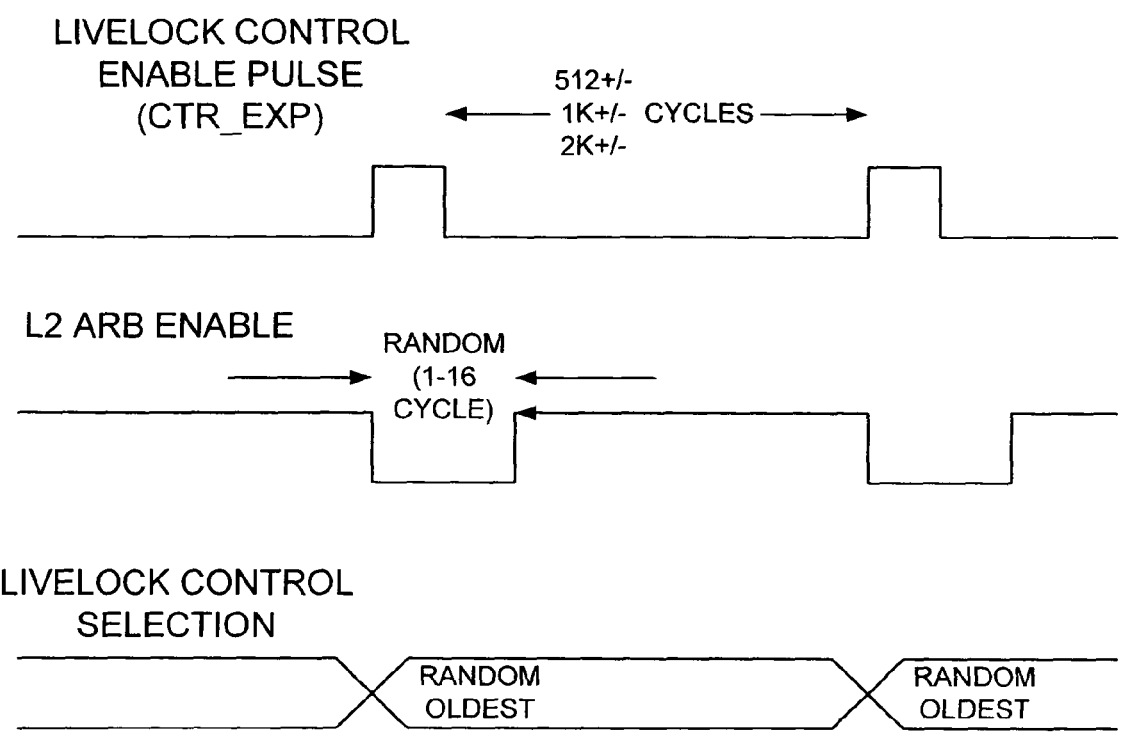
FIG. 3 is a timing diagram illustrating exemplary operation of the livelock-preventing selection logic apparatus of FIG. 2 in accordance with the preferred embodiment.

Referring also to FIG. 3, there is shown a timing diagram illustrating the LFSR signals generation. The livelock-prevent selection logic apparatus 200 is configurable to activate every 512, 1K or 2K cycles plus or minus a random offset, as illustrated at a line LIVELOCK CONTROL ENABLE PULSE (CTR_EXP).

The pulse output of pulse generator 204 at node CTR_EXP provides a control input to the first LFSR 202, an input to a count down counter 210, for example, starting from 0-15. A second LFSR 212 is coupled to the count down counter 210, which generates an output CNT_EXPIRED. The output CNT_EXPIRED and a switchable livelock enable signal inverted by an inverter 214 are applied to an OR gate 220. The switchable livelock enable signal CHK SWITCH LIVE-LOCK ENABLE optionally is provided for disabling the livelock-preventing select logic apparatus 200, and allowing the round-robin selection mechanism to exclusively be used, if desired. The ORed output and an L2 signal to allow load requests V_QS_ID_PRE_ARB_VAL are applied to an AND gate 222. The ANDed output is applied to an existing 2 GHz register 224, for example, where the clock speed of the logic 200 is 2 GHz, for generating the control signal L2_ARB_EN.

Referring again to FIG. 3, the control signal L2_ARB_EN is illustrated at a line labeled L2 ARB ENABLE. When the selection logic 200 is activated, the logic performs a hold-off of any requests for a random number of cycles, for example, between 1-16, using the countdown counter 212 based upon the applied input from the 4-bit LFSR 216.

Referring to FIG. 2, an AND gate 230 receives the pulse output of pulse generator 204 at node CTR_EXP at a first input and the switchable livelock enable signal CHK SWITCH LIVE-LOCK ENABLE at a second input. The output of AND gate 230 is applied to a register 232 and is ORed with an existing enable input applied to an OR gate 234. The random value generated by the LFST 216 is applied to a 1-HOT 236 to a selected input of a respective multiplexer MUX 238, MUX 240, MUX 242. The output of MUX 238 is inverted by an inverter 243 and applied to a register 244. The output of register 244 is inverted and provides the selection output P0 OLDEST and an input to the MUX 240. The output of MUX 240 is applied to a register 248 provides the selection output P1 OLDEST and an input to the MUX 242. The output of MUX 242 is applied to a register 250 provides the selection output P2 OLDEST and an input to the MUX 238.

The 1-hot selection signal P0 OLDEST, P1 OLDEST or P2 OLDEST is applied to multiplexer 116 in FIG. 1 for processor selection. The P0 OLDEST, P1 OLDEST and P2 OLDEST selection signals are normally updated in a round robin manner, and are randomly chosen when the livelock-preventing logic 200 controls selection, as illustrated in FIG. 3 at lines labeled LIVELOCK CONTROL SELECTION. When activated, the selection logic 200 provides a random oldest processor selection based on the value applied by LFSR 216. The use of a second LFSR 216 helps break the correlation between the activate duration and the processor selected/hold-off time.

While the present invention has been described with reference to the details of the embodiments of the invention shown in the drawing, these details are not intended to limit the scope of the invention as claimed in the appended claims.

What is claimed is:

1. A method for preventing livelocks in processor selection of load requests in a multiprocessor (MP) system comprising:
   providing a pair of linear feedback shift registers (LFSRs), each LFSR generating pseudo random values;
   changing from a round-robin selection mechanism to a livelock-preventing selection mechanism and holding up all load requests on random occasions for a random number of cycles;
   making a random selection responsive to holding up all load requests; and using said round-robin selection mechanism to continue selecting load request in a round robin order following said random selection.

2. A method for preventing livelocks in processor selection of load requests as recited in claim 1 wherein the random occasions are determined based upon a first one of the LFSRs.

3. A method for preventing livelocks in processor selection of load requests as recited in claim 2 wherein the random selection is determined based upon a second one of the LFSRs.

4. A method for preventing livelocks in processor selection of load requests as recited in claim 2 wherein said random number of cycles for holding up all load requests for the random selection is determined based upon a second one of the LFSRs.

5. A method for preventing livelocks in processor selection of load requests as recited in claim 1 wherein the random occasions the selection mechanism is changed includes a programmable interval together with a random offset from said programmable interval.

6. A method for preventing livelocks in processor selection of load requests as recited in claim 5 wherein said random offset from said programmable interval includes a random offset number of cycles before or after said programmable interval.

7. A method for preventing livelocks in processor selection of load requests as recited in claim 5 wherein said programmable interval includes a selected one of 512 cycles, 1K cycles, and 2K cycles.

8. Apparatus for preventing livelocks in processor selection of load request in a multiprocessor (MP) system comprising:
a pair of linear feedback shift registers (LFSRs), each LFSR generating pseudo random values;
a round-robin selection mechanism selecting load requests in a round robin order;
a livelock-preventing selection mechanism holding up all load requests on random occasions for a random number of cycles;
changing from said round-robin selection mechanism to said livelock-preventing selection mechanism making a random selection responsive to holding up all load requests; and
said round-robin selection mechanism selecting load requests in said round robin order following said random selection.

9. Apparatus for preventing livelocks in processor selection as recited in claim 8 wherein said livelock-preventing selection mechanism changes said random number of cycles for holding up all load requests for making the random selection.

10. Apparatus for preventing livelocks in processor selection as recited in claim 8 wherein the random occasions are determined based upon a first one of the LFSRs.

11. Apparatus for preventing livelocks in processor selection as recited in claim 8 wherein said random number of cycles for holding up all load requests is determined based upon a second one of the LFSRs.

12. Apparatus for preventing livelocks in processor selection as recited in claim 8 wherein the random selection is determined based upon a second one of the LFSRs.

13. Apparatus for preventing livelocks in processor selection as recited in claim 8 wherein said livelock-preventing selection mechanism includes a pulse generator for generating a pulse having a width of said random number of cycles following a programmable interval together with a random offset.

14. Apparatus for preventing livelocks in processor selection as recited in claim 8 wherein said livelock-preventing selection mechanism includes a pulse generator for generating a pulse every 512, 1K or 2K cycles plus or minus a random offset number of cycles.

\* \* \* \* \*